United States Patent [19]

Resor

[11] Patent Number: 5,472,253
[45] Date of Patent: Dec. 5, 1995

[54] WELDER'S DEBRIS PICK UP TOOL

[76] Inventor: John R. Resor, 3718 E. Grandlake Blvd., Kenner, La. 70065

[21] Appl. No.: 316,577

[22] Filed: Sep. 30, 1994

[51] Int. Cl.⁶ .................................................. B25J 15/06
[52] U.S. Cl. .................................................. 294/65.5
[58] Field of Search ................... 294/65.5, 1.1, 294/19.1; 335/285, 291, 293, 294, 303

[56] References Cited

U.S. PATENT DOCUMENTS

| | | | |
|---|---|---|---|
| 1,521,173 | 12/1924 | Catching | 294/65.5 |
| 2,166,024 | 7/1939 | Schmidt | 294/65.5 X |
| 2,428,864 | 10/1947 | Boyd | 294/65.5 |
| 2,517,325 | 8/1950 | Lamb | 294/65.5 X |
| 2,873,136 | 2/1959 | Bennet | 294/65.5 |
| 3,684,288 | 8/1972 | Grace | 294/65.5 |
| 4,554,703 | 11/1985 | Matuki | 294/65.5 X |
| 5,261,714 | 11/1993 | Slusar et al. | 294/65.5 |
| 5,265,887 | 11/1993 | Stelmach | 294/65.5 |

*Primary Examiner*—Dean Kramer
*Attorney, Agent, or Firm*—John R. Resor

[57] ABSTRACT

A hand held magnetic pickup which meets both the requirements of being able to remove magnetic debris from a narrow channel or gap, and of being sufficiently strong to pick up all magnetic debris over a wide area. The invention is an elongate, rare earth magnet in the form of a rod or bar having a narrow cross section, embedded in a wooden or other non magnetic handle. The length of the magnet is greater than twice the length of the handle, so that the overall magnet has a high length to cross section ratio.

1 Claim, 1 Drawing Sheet

WELDER'S DEBRIS PICK UP TOOL

BACKGROUND OF THE INVENTION

This invention pertains to magnetic pick up tools.

U.S. Pat. No. 2,517,325 to Lamb, in disclosing a magnetic probe which is intended to provide different amounts of magnetic force for an instrumentation purpose, discloses a probe in which a bar magnet can be extended outside of a magnetic shielding material so as to provide for concentration of the magnetic lines of force at the exposed pole. (See FIG. 2.)

U.S. Pat. No. 4,813,729 to Speckhart discloses a magnetic retrieval tool in which the magnet is contained within a removable shielding so as to reduce its magnetic attraction along the side of the magnet. The device is claimed to have the capability of attracting off its front face but having limited attraction from its side faces to other magnetic materials.

U.S. Pat. No. 2,993,723 to Twachtman and others discloses a flexible magnetic retrieving device.

U.S. Pat. No. 3,169,791 to Twachtman shows a pick up in which the magnet is press fit within the end of the housing and is exposed rather than working through a magnetic pole.

U.S. Pat. No. 2,285,440 to Kaiser shows a magnet, slidably mounted within a non-magnetic rod, which is connected to a pull cable so that the magnet can be allowed to be extended out to pick up objects or, alternatively, retracted into a sleeve so as to weaken the magnetic force and release the object being attracted.

U.S. Pat. No. 5,265,887 to Stelmach shows a magnetic pick-up tool encased within an outer sleeve so that the entire tool can be positioned next to an object to be picked up and then the magnet extended to attract the object. Alternatively, the magnet can be retracted within the sleeve so as to prevent the magnet from being attracted to objects while the tool is being positioned to a place of pick up.

U.S. Pat. No. 512,381 to Keyers discloses an early form of magnetic pick up tool where the tip of the magnet is within a sleeve and is extended so as to provide for a pick up effect.

U.S. Pat. No. 3,789,336 to Gordin discloses a retractable holder for a magnet which provides for two positions for the magnetic device: exposed to provide for magnetic attraction and retracted within a shielding sleeve so as to reduce the magnetic attraction of the device.

A device in which an elongate bar magnet is provided with one pole embedded in a non-magnetic handle and the other pole extending distance away so as to provide for nearly parallel magnetic lines of force along the side of the device and concentration of the lines of force at the end of the device is not shown in this art

SUMMARY OF THE INVENTION

This invention pertains to the field of welder's tools, and specifically to tools for the removal of loose metal particles and slag during welding and welding rework.

The invention is an improved magnetic scrap pickup, of particular value as a hand tool for welders. It combines the strength of magnetic pickup of a large magnetic parts pickup, while being sufficiently small that it can be used in confined spaces.

In welding it is common that the weld is inspected by radiographic or other processes; defects found are then ground out, leaving a deep narrow channel where the defective weld was removed. Loose particles and slag must then be removed before the channel can be correctly re welded.

After welding, the weld is commonly wire brushed to loosen slag and debris; these items must then be removed. This requires a tool which may rapidly be swept or passed over a relatively extensive area or along a length of weld, and which has sufficient magnetic strength to draw in all loose ferrous debris that it passes over.

The invention is a hand held magnetic pickup which meets both the requirements of being able to remove magnetic debris from a narrow channel or gap, and of being sufficiently strong to pick up all magnetic debris over a wide area. The invention is a elongate, rare earth magnet in the form of a rod or bar having a narrow cross section, embedded in a wooden or other non magnetic handle. The length of the magnet is greater than twice the length of the handle, so that the overall magnet has a high length to cross section ratio.

The magnet is magnetized so that the poles of the magnet are the extreme ends of the magnet. Consequently, the magnetic field is concentrated off the exposed end of the tool, and then the magnetic field flows along the exposed sides of the magnet. Held sideways, the side field picks up magnetic debris over a wide area as the tool is held flat across the weld and swept along the weld. When a gap or crevice must be cleaned the tool is inserted into the gap, and the concentrated field off the end cleans all debris from the gap. The small size of the tool, and the fact that the entire tool is a magnet, without any surrounding metal of non magnetic structure, permits a stronger pickup in a smaller space than heretofore seen in such tools.

It is thus an object of the invention to disclose a compact hand held magnetic pickup having effectively stronger attraction for size than heretofore seen.

It is a further object of the invention to show a hand held magnetic pickup which both sweeps from a wide area and effectively picks magnetic debris from within confined gaps and openings.

It is a further object of the invention to disclose a hand held tool which more effectively cleans loose debris from welds and weld repairs.

These and other objects of the invention may be seen from the detailed description of the invention below.

DETAILED DESCRIPTION OF THE INVENTION

Figure 1:
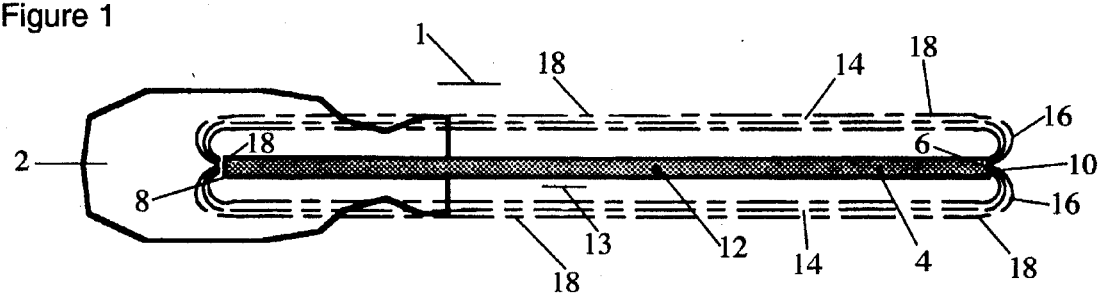
FIG. 1 is a side view of the tool.
Figure 2:
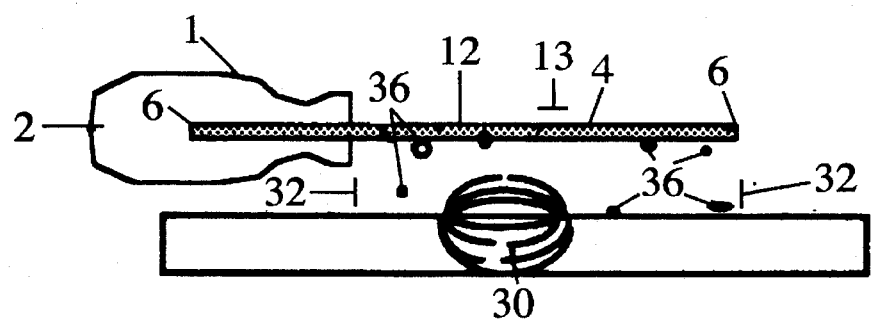
FIG. 2 is a view of the tool being passed along a weld.
Figure 3:
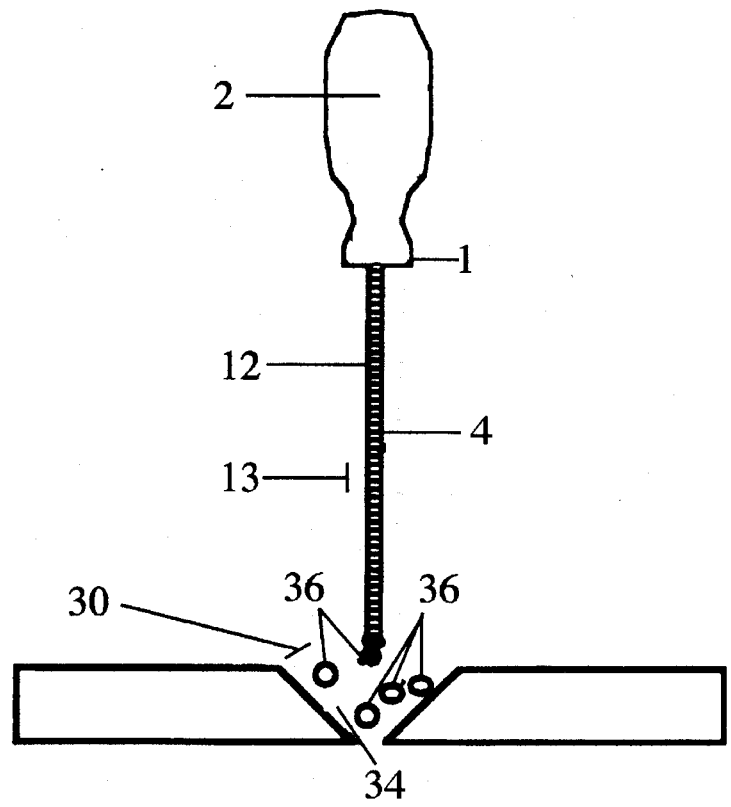
FIG. 3 is a view of the tool cleaning a weld crevice.

The drawings show the inventive tool 1 comprising first a handle 2 adapted for easy holding by a user's hand. This handle is made preferably of wood or a plastic material. It must be non magnetic and must not bend or distort magnetic lines of force.

Embedded in the handle 2 is an elongate bar magnet 4. This magnet is a powerful permanent magnet, preferably a rare earth magnetic material or a cobalt based magnetic material. The bar magnet 4 is magnetized so that the poles of the magnet are the ends 6 of the magnetic bar 4. One such end 6 is the handle end 8, embedded in the handle; the other end is the extreme end 10 of the tool 1.

Magnet 4 is constructed as an elongate bar. In a preferred embodiment, the bar is about ¼ inch to ⅜ inch in diameter and is sufficiently long that at least 5 inches of exposed magnetic material 12 protrude from the handle 2. As a consequence the magnetic lines of force 14 are concentrated at the extreme end 10, and this concentrated magnetic force 16 extends forward of the tool 1 for a distance around the end 10. The lines of force 14 then flow along the sides 13 of the magnet, forming an extended area 18 of magnetic force along the entire length of the exposed magnetic material 12.

A magnetic keeper (not shown) in the form of a soft iron cap, may be formed as a closed end tube which may be slid over the end of the tool when it is not in use. It is understood that such keepers are desirable to preserve the strength of permanent magnets, and also act to capture and redirect the magnetic lines of force from the magnet so as to lessen the tool's tendency to attract other magnetic items while in storage.

Thus, depending on how the tool 1 is held, it can be held pointing at a point, and the concentrated force 16 off the end 10 draws magnetic debris strongly from a small target area. Alternately the tool 1 may be held flat, and close to an area to be swept; the extended lines of force 18 along the sides 13 of the magnet will then sweep over a wide area, drawing in magnetic debris under the magnet as swept.

Welding is known to produce slag and loose magnetic particles which must be removed as part of the clean up of the welded area. The inventive tool 1 provides a convenient quick hand held tool for such cleanup. The welder, after wire brushing the area along a weld 30, holds the tool 1 flat over the weld 30, crosswise to the line of the weld 30. He/she then sweeps the tool 1 along the line of the weld, and the tool sweeps a path 32 as wide as the exposed magnet sides 13 are long. This rapidly picks up substantially all the debris 36 along the weld 30 in one pass.

Welds are also reworked to eliminate flaws. This is done by grinding out the defective section of weldment along the line of the weld. This leaves a narrow, deep crevice 34 along the line of the weld 30, which contains magnetic slag, dust and scrap particles 36 from the grinding process. The welder then holds the tool 1 so that the extreme end 10 is pointed into and inserted into the crevice 34. The concentrated lines of force 16 off the end 10 gather up these particles 36. Since these particles 36 follow the flow of the lines of force, they tend to bunch up as an extension out from the end, and thus are not knocked off the tool as it is withdrawn from the crevice 34. This extended line of force effect is a result of the tool's construction as a magnet 4 having a high length to width ratio; it makes the tool 1 especially suitable for removing slag and chips from confined spaces, especially in welded tubes and similar confined spaces.

It can thus be seen that the invention is a simple hand tool, but provides several significant advantages to a welder in cleaning up ferrous debris from welding. These advantages are the result of the tool comprising an elongate exposed permanent magnet having a high length to width ratio, and the absence of any magnetic material in the tool other than the magnet, thus preventing distortion of the highly concentrated magnetic lines of force off the end of the tool, or of the even lines of force along the sides of the tool.

I claim:

1. A Method of removing slag or loose particles from a welded area comprising:

(a) providing a hand manipulable tool having a non-magnetic handle into which an elongate permanent magnet is embedded such that one magnetic pole of the magnet is located at an end of the magnet embedded within said handle, and the other magnetic pole is located at a free end of an extended portion of the magnet; and (b) sweeping said tool by hand along said welded area where said slag or loose particles exist such that said exposed portion of the magnet attracts said slag or loose particles and removes said slag or loose particles from said welded area.

* * * * *